Dec. 19, 1961    R. J. M. KEBLUSEK ET AL    3,014,166
ELECTROLYTIC CAPACITOR
Filed March 31, 1958
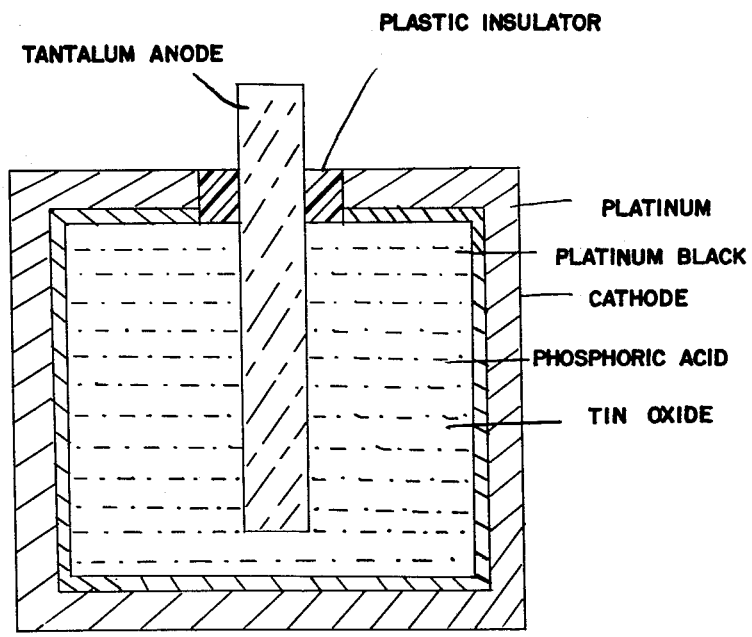
INVENTORS
RICHARDUS JOZEPHUS MARIA KEBLUSEK
PETER WINKEL
SJERP ANNE TROELSTRA
BY
AGENT

United States Patent Office 3,014,166
Patented Dec. 19, 1961

3,014,166
ELECTROLYTIC CAPACITOR
Richardus Jozephus Maria Kebluseck, Peter Winkel, and Sjerp Anne Troelstra, all of Eindhoven, Netherlands, assignors to North American Philips Company, Inc., New York, N.Y., a corporation of Delaware
Filed Mar. 31, 1958, Ser. No. 725,150
Claims priority, application Netherlands Apr. 3, 1957
5 Claims. (Cl. 317—230)

This invention relates to electrolytic capacitors.

The use of paste-like and jellified electrolytes in electrolytic capacitors is known. For this purpose, greatly different substances, for example organic binders, such as starch, have been added to the usual electrolytes and also inorganic substances, such as bentonite and silica suspensions of which can be obtained with sufficient rigidity. The use of such so-called solid electrolytes may be important more particularly if difficulties are encountered in sealing the capacitor.

As a rule, the resistance of such solid electrolytes is greatly increased in proportion to the content of the substance added. However, it has been found that tin-oxide suspensions in electrolytes which may be used in electrolytic capacitors having an electrode of tantalum or columbium covered with a dielectric oxide layer, show this disadvantage to a greatly lesser extent.

This phenomenon is possibly connected with the occurrence of a small amount of conductivity at the surface of the tin-oxide particles. This is considered to result from the formation of an electric double layer due to reaction of the tin-oxide with the electrolyte, which is evidently limited to the surface of the tin-oxide particles.

The present invention, which is based upon the foregoing, relates to an electrolytic capacitor comprising at least one electrode of tantalum or columbium, covered with a dielectric oxide layer, and an electrolyte, and it is characterised in that the electrolyte consists of a suspension of tin-oxide in the electrolyte.

The single figure of drawing shows one embodiment of the device in section.

In order to reduce the specific resistance of the electrolyte, it is advantageous for the tin-oxide content to be chosen as low as possible. However, it is necessary for the suspension to be homogeneous and to have sufficient rigidity. For this purpose, use is preferably made of a suspension manufactured from tin-oxide particles having a large tap volume, for example of the order of 1 cm.$^3$ per gram. Furthermore, the suspension is used in the flocculated state.

The disadvantage of possible desiccation of the solid electrolyte, which would result in a slightly increased resistance, may be overcome to a great extent by choosing the concentration of the electrolyte to be such that, as a result of its hydroscopic character, the electrolyte retains on the average the same water content under the normally prevailing conditions of temperature and atmospheric humidity. Such is the case, for example, when use is made of approximately 24 N phosphoric acid and approximately 8 N sulphuric acid.

For manufacturing an electrolyte according to the invention, the initial material used is, for example, tin-oxide which has a size of particles between 0.2 and 1 micron and which has a shaking volume of 1.5 cm.$^3$ per gram. 2 grams of this tin-oxide are suspended, for example, in 1 cm.$^3$ of 24 N phosphoric acid.

It is also possible to obtain an electrolyte by suspending 2 grams of the specified tin-oxide in 0.9 cm.$^3$ of a KI-solution which has been saturated to about 75%.

An electrolytic capacitor is composed, for example, of an anode comprising a porous sintered tantalum pastille having a diameter of 1.5 mms. and a length of 5 mms., which is arranged in centred position in a cylindrical cathode having an inner diameter of 10 mms., which consists of platinum and the inner side of which is covered with a thin layer of platinum black of about 1 micron thick. The anode has been electrolyically oxidised to a voltage of 8 volts in a 24 N phosphoric-acid electrolyte. The table following hereinafter specifies the series-resistance and the capacity, measured at frequencies of 50 and 5000 c./s., of this capacitor having as an electrolyte (1) 24 N phosphoric acid, or the described tin-oxide suspension in phosphoric acid.

(2) A KI-solution saturated to 75%, of the described tin-oxide suspension in the KI-solution.

| No. | Electrolyte | $R_{50}$ in $\Omega$ | $C_{50}$ in $\mu f.$ | $R_{5000}$ in $\Omega$ | $C_{5000}$ in $\mu f.$ |
|---|---|---|---|---|---|
| 1 | 24 N phosphoric acid | 6 | 23 | 3 | 18 |
|   | SnO$_2$ suspension in phosphoric acid | 7 | 23 | 4 | 17 |
| 2 | KI-solution | 3 | 20.5 | 2 | 20 |
|   | SnO$_2$ suspension in KI | 3.5 | 19.4 | 2.5 | 19.4 |

What is claimed is:

1. An electrolytic capacitor having at least one electrode formed of a metal selected from the group consisting of tantalum and columbium and a solidified electrolyte consisting of a flocculated suspension of tin oxide particles in an aqueous solution of an electrolyte other than thin oxide.

2. An electrolytic capacitor having at least one electrode formed of a metal selected from the group consisting of tantalum and columbium and a solidified electrolyte consisting of a flocculated suspension of tin oxide particles in an aqueous solution of an electrolyte other than tin oxide, said electrolyte other than tin oxide being hygroscopic and being employed in a concentration such that its water content remains about the same under normally prevailing conditions of atmospheric temperature and pressure.

3. The capacitor of claim 2 in which the tin oxide is suspended in an aqueous solution selected from the group consisting of 24 N phosphoric acid and 8 N sulfuric acid.

4. The capacitor of claim 3 in which the tin oxide has a tap volume of about 1 cc. per gram.

5. The capacitor of claim 1 in which the tin oxide is suspended in an aqueous solution of potassium iodide saturated to about 75%.

References Cited in the file of this patent
UNITED STATES PATENTS

| | | |
|---|---|---|
| 368,608 | Peyrusson | Aug. 23, 1887 |
| 1,647,650 | Morrison | Nov. 1, 1927 |
| 1,918,717 | Ruben | July 18, 1933 |
| 1,976,700 | Lilienfeld | Oct. 9, 1934 |
| 1,986,779 | Lilienfeld | Jan. 1, 1935 |
| 1,990,274 | Edelman | Feb. 5, 1935 |
| 2,005,279 | Van Geel | June 18, 1935 |
| 2,051,592 | Craine | Aug. 18, 1936 |